(12) United States Patent
Krohn et al.

(10) Patent No.: US 7,037,101 B2
(45) Date of Patent: May 2, 2006

(54) CENTER CYLINDER EJECTION ASSIST

(75) Inventors: Roy N. Krohn, Wrightsville, PA (US); Gregory D. Taylor, York, PA (US)

(73) Assignee: Graham Packing Company, L.P., York, PA (US)

( * ) Notice: Subject to any disclaimer, the term of this patent is extended or adjusted under 35 U.S.C. 154(b) by 38 days.

(21) Appl. No.: 10/413,403

(22) Filed: Apr. 15, 2003

(65) Prior Publication Data

US 2004/0207118 A1 Oct. 21, 2004

(51) Int. Cl.
*B29C 49/48* (2006.01)
*B29C 49/70* (2006.01)

(52) U.S. Cl. ............ 425/525; 425/537; 264/334; 264/335; 264/336; 264/523

(58) Field of Classification Search ......... 264/334, 264/523, 335, 336; 425/537, 525
See application file for complete search history.

(56) References Cited

U.S. PATENT DOCUMENTS

| | | | | |
|---|---|---|---|---|
| 4,299,371 A | * | 11/1981 | Duga | 249/68 |
| 5,122,051 A | * | 6/1992 | Joyner | 425/556 |
| 5,736,170 A | * | 4/1998 | Stoner | 425/537 |
| 6,036,472 A | * | 3/2000 | Boudreau et al. | 425/556 |
| 6,604,934 B1 | * | 8/2003 | Ciccone et al. | 425/556 |
| 6,709,261 B1 | * | 3/2004 | Cargile et al. | 425/536 |
| 6,709,624 B1 | * | 3/2004 | Lisch et al. | 264/537 |

FOREIGN PATENT DOCUMENTS

| | | | |
|---|---|---|---|
| JP | 2000-102970 | * | 4/2000 |
| SU | 1799746 A1 | * | 2/1991 |

* cited by examiner

*Primary Examiner*—Stefan Staicovici
(74) *Attorney, Agent, or Firm*—Venable LLP; Keith G. Haddaway; Caroline J. Swindell

(57) ABSTRACT

A method of ejecting containers from a blow mold comprises the steps of: opening a blow mold containing containers, the blow mold comprising a pair of pistons having a head and a heel, an end cap disposed behind the heel, and a pair of ejector rods, each ejector rod coupled to a different piston; simultaneously with the opening forcing a fluid against each head of each of the pair of pistons, extending each of the ejector rods to maintain contact with an opposite side of a center portion of the containers in the blow mold and pushing the containers from the blow mold; and forcing a fluid against the heel of each of the pair of pistons operative to retract the pair of ejector rods away from the containers when the containers are separated from the blow mold.

16 Claims, 3 Drawing Sheets

CENTER CYLINDER EJECTION ASSIST

BACKGROUND OF THE INVENTION

1. Field of the Invention

The present invention relates generally to the blow-molding container manufacturing process and more particularly to ejecting blow-molded containers from molds.

2. Related Art

One method of producing hollow plastic containers, such as bottles, is blow-molding. Blow-molding is a process of forming a molten tube of thermoplastic material, then blowing up the tube with compressed air to conform to the interior of a chilled blow mold. The most common methods are extrusion, injection, and injection-stretch blow molding.

The extrusion method is usually used to form containers weighing more than 12 grams, such as containers for food and laundry detergents. The method uses a continuously running extruder with a tuned die head that forms the molten plastic tube. The tube is then pinched between two mold halves. A blow pin or needle is inserted into the tube and compressed air is used to blow up the part to conform to the chilled mold interior. The accumulator-extrusion method is similar, however, the molten plastic material is accumulated in a chamber prior to being forced through a die to form the tube.

Injection blow molding is usually used when accurate wall-thickness and/or a high-quality neck finish is needed, or when a polymer cannot be extruded. The method is a process of injection molding a preform (similar in shape to a test tube), then taking the tempered preform to a blow mold to be filled with compressed air to conform to the interior of the blow mold.

Stretch blow molding is used for polymers that are difficult to blow, such as crystalline and crystallizable polymers, e.g. polypropylene and polyethylene terephthalate. Stretch blow molding can be a single-stage process similar to standard injection blow molding, by adding the element of stretch prior to blow forming. Also, a two-step process is possible, where a preform is made in an injection molding machine, then taken to a reheat-stretch blow molding machine for preform reheating and final blow forming in a blow mold.

After a bottle is blow-molded, the mold is opened to allow the bottle to fall out for further processing. Often, however, part of the bottle sticks to the mold. When the bottle sticks to the mold, several problems can occur. First, some manufacturing systems have a safety stop switch. When the bottle becomes stuck in a mold, the manufacturing switch is triggered shutting down the manufacturing line and causing delays in the manufacturing process. Second, the bottle may eventually fall on its own, or may be un-stuck by a conventional ejection-assist system, but deformation of the bottle can occur as a result of sticking, for example, causing the bottle to bend around the sticking part before ultimately falling. A bent bottle will cause problems further down in the manufacturing process, which relies on properly formed bottles in order to operate efficiently.

This is particularly a problem for dual cavity systems. In a dual cavity system, two containers are molded simultaneously. The two containers are typically joined at the top finish end through a moil to form a "log." In downstream operations, subsequent to molding, trimming and finishing occurs, where, for example, the moil is trimmed off as scrap. The downstream trimming and finishing requires several steps. For example, the log must be transported to a trimmer. In the trimmer, a cutter cuts the moil from the top of each container. The neck is then finished by, for example, reaming or cleaning of the opening. In addition, the flash, or scrap around the seam of the containers must be trimmed either before or after the individual containers are generated by cutting from the log. In many of these downstream operations, proper orientation of the log is required. Orientation of the log can be performed by automated machinery. However, if the log is bent, for example at the moil, the automated machinery may be unable to handle the bottles, i.e. the bent log does not properly fit in the automated machinery. As a result, the downstream processes are affected. For example, the bent log may become lodged in the trimmer, cutter or cleaner resulting in machine malfunction and system downtime. Alternatively, the container may be improperly cut leading to an increase in waste. In either event, system efficiency is decreased.

One conventional ejection-assist system is a pneumatic ejection system. It operates on dual-cavity container "logs" where the two containers are joined at the neck by a moil in the mold. The bottom of each bottle has a tail-flash extending from it. The conventional ejection-assist system has ejector rods that hold the tail-flash while the mold opens. The ejector rods push the log from the mold and then are retracted by timed air-cylinders. However, because the ejector rods push the log from its ends, if the moil in the middle is stuck to the mold, the force of the push will bend the log at the middle, causing problems further down the manufacturing line.

What is needed then is an improved system and method for ejecting blow-molded containers that overcome the shortcomings of conventional solutions.

BRIEF SUMMARY OF THE INVENTION

In summary, an exemplary embodiment of the present invention provides an improved method of ejecting blow-molded containers from their molds by pushing against the center portion of the molded container. This prevents the container from sticking to the mold and bending.

In an exemplary embodiment, the present invention can be an ejection-assist apparatus for ejecting a container from a mold cavity comprising: a mold half cooperating with a second mold half to form the mold cavity; an ejector rod having a contact end for contacting the container and a back end; a cylinder body around the ejection rod; a piston having a heel and a head and coupled to the back end of the ejector rod; a cylinder barrel around the piston having an end cap and an front end, the piston being slidable within the cylinder barrel, and the front end contiguous with the cylinder body; a forward fluid passage having a blowing end and a back end, the blowing end operative to blow fluid into the cylinder barrel through the end cap on the head of the piston and the back end connectable to a first external fluid supply; and a return fluid tube having a blowing end and a back end, the blowing end operative to blow fluid into the barrel cylinder on the heel of the piston and the back end connectable to a second external fluid supply, wherein blowing a fluid on the head of the piston moves the piston and the ejector rod into an extended position and blowing a fluid on the heel of the piston moves the piston and the ejector rod into a retracted position.

In another exemplary embodiment, the present invention can be a method of ejecting a container from a blow mold comprising the steps of: opening a blow mold containing a container, the blow mold comprising a pair of pistons having a head and a heel, an end cap disposed behind the heel, and a pair of ejector rods, each ejector rod coupled to a different one of the pistons; simultaneously with the opening forcing a fluid against each head of each of the pair of pistons, extending each of the ejector rods to maintain contact with an opposite side of a center portion of the container in the blow mold and pushing the container from the blow mold; and forcing a fluid against the heel of each of the pair of pistons operative to retract the pair of ejector rods away from the container when the container is separated from the blow mold.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1:
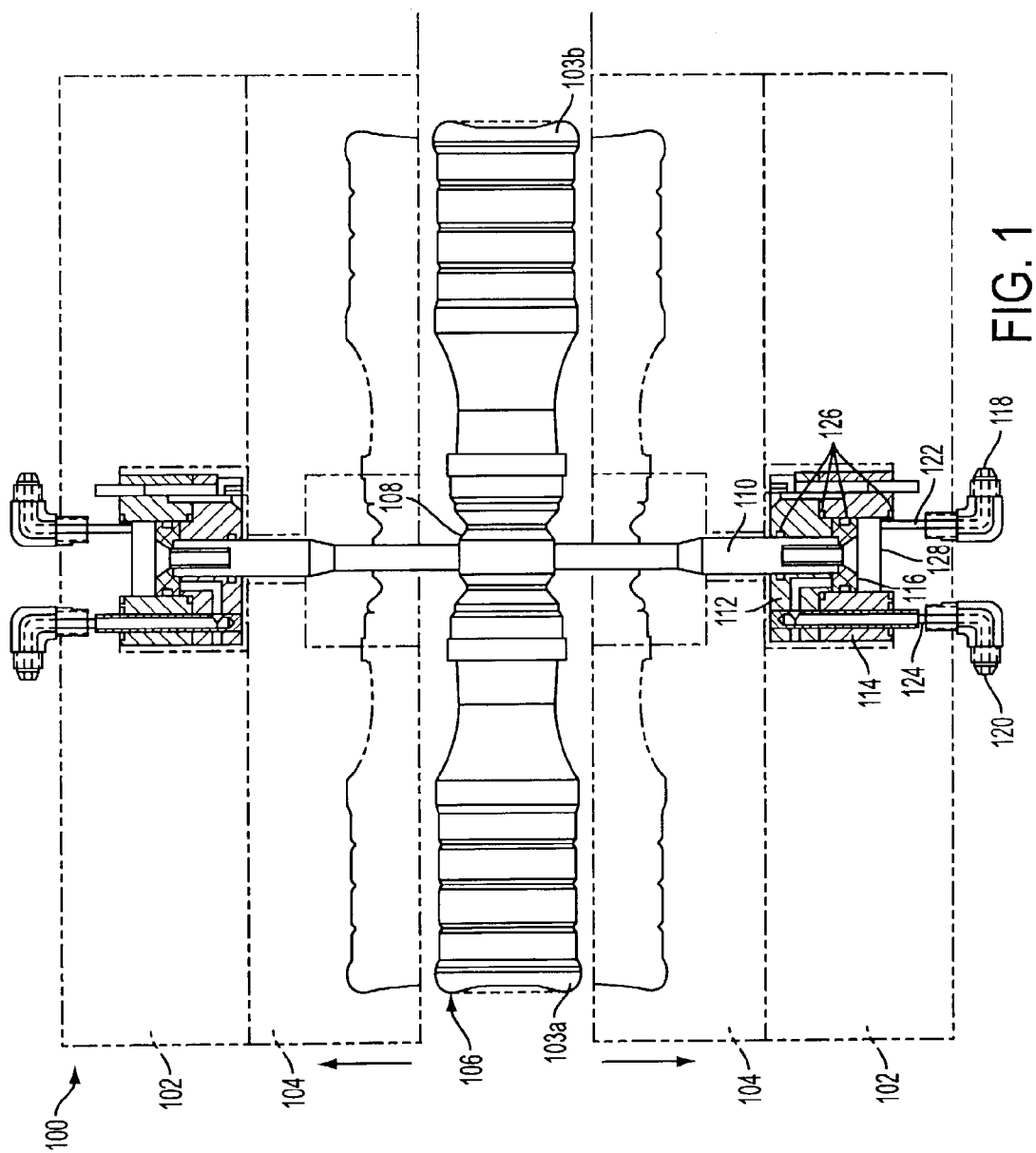
FIG. 1 depicts top view cross-section of an exemplary embodiment of the apparatus in a extended position according to the present invention.

FIG. 1 depicts a top view cross section 100 of an exemplary embodiment of the present invention. The dual-cavity blow mold consists of two halves, each half made of a back plate 102 and a cavity block 104. The bottle "log" 106 consists of two containers 103a and 103b, for example, bottles, joined at the neck by a moil 108. An ejection assist assembly is placed in each half of the blow mold. The assembly includes an ejector rod 110. The ejector rod 110 comes in contact with the moil 108 during the ejection assist process and pushes the moil 108 out of the cavity block 104.

The apparatus that drives the ejector rod 110 is housed, in an exemplary embodiment, in the back plate 102 of the mold. The apparatus is made up of a cylinder body 112 that surrounds a back portion of the ejector rod 110, and a cylinder barrel 114 behind, and coupled to, the cylinder body 112. The apparatus is further comprised of a piston 116, housed inside the cylinder barrel 114 and directly behind and fastened to the ejector rod 110, and two fluid fittings 118 and 120 that cause the piston 116 to move back and forth along the axis of the ejector rod 110 by using forward fluid passage 122 and return fluid tube 124, respectively, as will be explained in further detail below with respect to FIGS. 2 and 3. The fluid passage 122 and tube 124 are sealed, in an exemplary embodiment, with a number of "O" rings 126. An end cap 128 which is part of the back plate 102 fills the inner diameter of the cylinder barrel 114 at the back of the apparatus, and has a hole for the forward air passage 122. In an exemplary embodiment, the cylinder barrel 114 and the cylinder body 112 can be one single piece.

In the exemplary embodiment described herein, the fluid used to move the assembly between the extended and retracted positions is air. In other embodiments, other fluids can be used such as other gases, for example, nitrogen or inert gases, or liquids, for example, a hydraulic fluid. Fluids can be supplied from a fluid source outside the mold or molding machine such as for example, a pneumatic air line. The control of the supply of fluid to the forward and return fluid tubes is conducted externally to the ejector system assembly. Fluid in-flow may be microprocessor controlled and can be part of the overall control mechanism of the molding system of which the invention forms a part. Such control systems are known in the art and can be suitably modified by the skilled artisan using known techniques.

Figure 2:
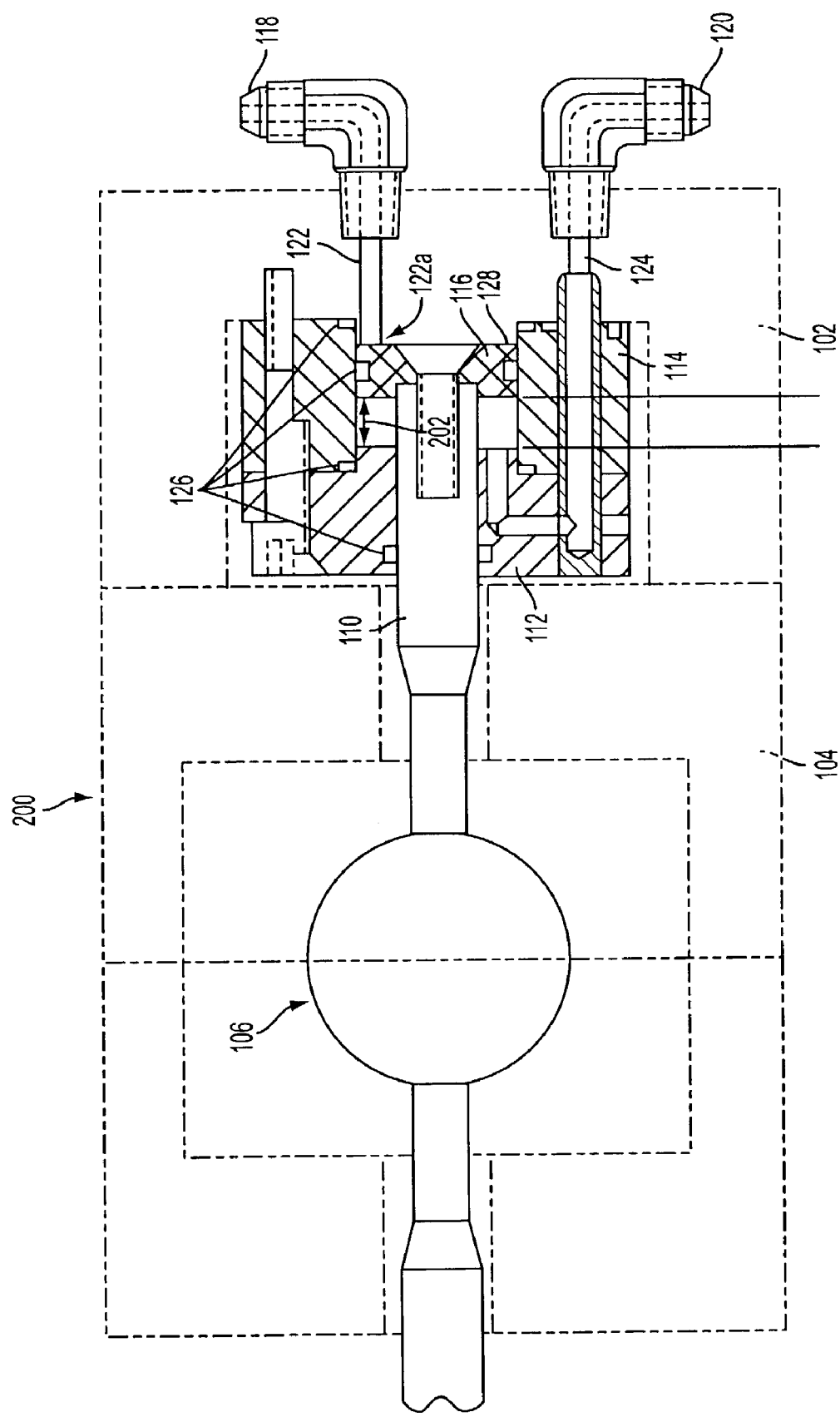
FIG. 2 depicts an end view cross-section of an exemplary embodiment of the apparatus in an retracted position according to the present invention.

FIG. 2 depicts an end view cross section 200 of an exemplary embodiment of the apparatus in a retracted position according to the present invention. The pair of ejector rods 110 are retracted and are in contact with the moil 108. When in the retracted position, there is a space 202 between the heel of the piston 116 and the back of the cylinder body 112. The forward air passage 122 has its blowing end 122a in contact with the back of the piston 116. As the mold opens, the pair of ejector rods 110 extend inwardly to maintain contact with the moil 108 and push it from the mold cavity block 104. The extension of the rods 110 occurs when air is forced through the air fitting 118, through the forward air passage 122, and against the back of the piston 116, pushing the piston 116 forward towards the mold and closing space 202.

Figure 3:
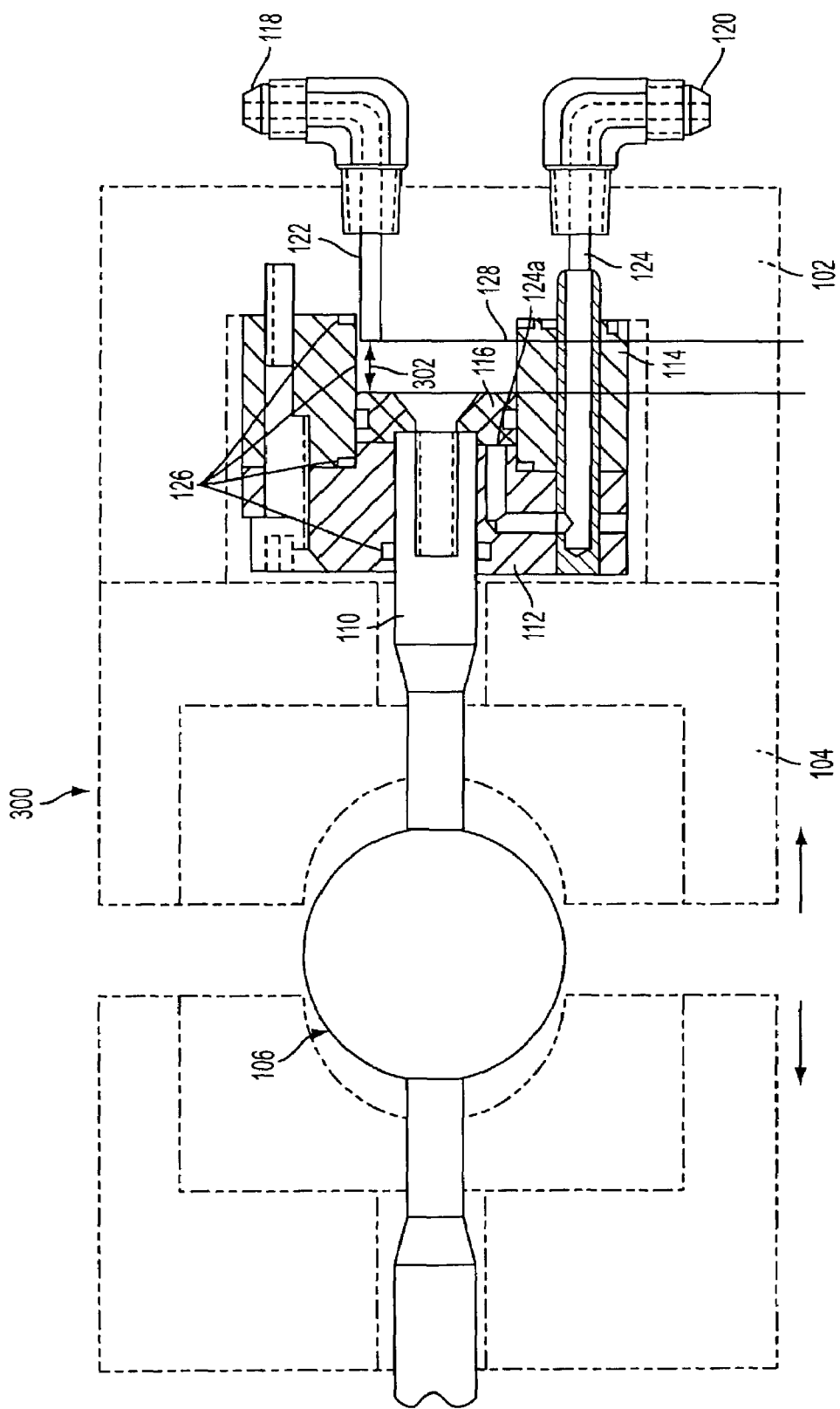
FIG. 3 depicts an end view cross-section of an exemplary embodiment of the apparatus in a extended position according to the present invention.

FIG. 3 depicts an end view cross section 300 of an exemplary embodiment of the apparatus in an extended position according to the present invention. The piston 116 has moved the ejection assist assembly forward. While the assembly is in the extended position, there is a space 302 between the end cap 128 and the head of the piston 116. In an exemplary embodiment, the piston 116 pushes the ejector rod 110 forward approximately 0.25 to 0.5 inches or more. The blowing end 124a of the return air tube 124 is now in contact with the heel of the piston 116. To retract the assembly, air is then forced through air fitting 12, and through return air tube 124 to push back against the heel of piston 116, which causes the piston 116 and the attached ejector rod 110 to move back away from the cylinder body 112 and back toward the end cap 128.

In an exemplary embodiment, the timing of the ejection assist action is very important. The action is begun at about the exact moment that the mold itself begins to open. This precise timing prevents the moil 108 from being dented or distorted when ejected by the ejector rods 110.

Another feature of the present invention is that ejection assist assembly, although mounted within part of the mold, is easily accessible, in an exemplary embodiment, by removing the back plate of the mold. Further, the air fittings do not need to be attached to the cylinder that houses the piston. Instead, the forward air fitting is directed at the back of the piston, but is not attached to it.

Another feature of the present invention is that the location of the ejection mechanism is not restricted to the back plate. In an exemplary embodiment, the ejection mechanism can be part of the mold body. Further, the ejection mechanism does not need to be in the center of the mold. It can be placed anywhere in the mold where it is needed. Additionally, there can be more than one ejection mechanism in the mold, which is useful especially for large containers.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. An ejection-assist apparatus for ejecting a container having a central axis from a mold cavity comprising:
    a first mold half cooperating with a second mold half to form the mold cavity;
    an ejection assist apparatus in said first mold half, said ejection assist apparatus comprising:
        an ejector rod having a back end and a contact end for contacting the container in a direction transverse to the central axis;
        a cylinder body around said ejection rod;
        a piston having a heel and a head and coupled to said back end of said ejector rod;
        a cylinder barrel around said piston having an end cap and a front end, said piston being slidable within said cylinder barrel, and said front end contiguous with said cylinder body;
        a forward fluid passage having a blowing end and a back end, said blowing end operative to blow fluid into said cylinder barrel through said end cap on said head of said piston and said back end connectable to a first external fluid supply; and
        a return fluid tube having a blowing end and a back end, said blowing end operative to blow fluid into said barrel cylinder on said heel of said piston and said back end connectable to a second external fluid supply,
    wherein blowing a fluid on said head of said piston moves said piston and said ejector rod into an extended position and blowing a fluid on said heel of said piston moves said piston and said ejector rod into a retracted position.

2. The ejection-assist apparatus of claim 1, wherein the fluid is air.

3. The ejection-assist apparatus of claim 1, wherein the ejector rod is aligned for contacting said contact end with a center portion of a container log made in the mold cavity.

4. The ejection-assist apparatus of claim 1, further comprising an open space between said head of said piston and said end cap when said piston is in an extended position.

5. The ejection-assist apparatus of claim 1, further comprising an open space defined by said heel of said piston, said cylinder body and said ejector rod when said piston is in a retracted position.

6. The ejection-assist apparatus of claim 1, wherein an inside diameter of said cylinder barrel is larger than an inside diameter of said cylinder body.

7. The ejection-assist apparatus of claim 1, wherein said return fluid tube directs fluid through said cylinder body.

8. The ejection-assist apparatus of claim 1, wherein the first mold half comprises a back plate and a cavity block, wherein said ejection-assist apparatus is in said back plate.

9. The ejection-assist apparatus of claim 8, wherein said back plate comprises said cylinder body and said cylinder barrel.

10. The ejection-assist apparatus of claim 8, further comprising a forward fluid fitting attached to said back plate and connected to said forward fluid passage; and a return fluid fitting attached to said back plate and connected to said return fluid tube.

11. The ejection-assist apparatus of claim 1, further comprising a forward fluid fitting attached to said mold body and connected to said forward fluid passage; and a return fluid fitting attached to said mold body and connected to said return fluid tube.

12. The ejection-assist apparatus of claim 1, wherein said mold cavity is adapted for molding a container log that comprises a first container and a second container joined by a moil.

13. The ejection-assist apparatus of claim 12, wherein said ejector rod is positioned in said first mold half to contact said moil.

14. The ejection-assist apparatus of claim 1, wherein the first mold half comprises a back plate and a cavity block, wherein said ejection-assist apparatus is in said cavity block.

15. The ejection-assist apparatus of claim 1, wherein at least two ejection-assist apparatuses are disposed in said first mold half.

16. The ejection-assist apparatus of claim 1, further comprising:
    an ejection assist apparatus in each of said first mold half and said second mold half.

* * * * *